United States Patent
Gramss et al.

(10) Patent No.: US 9,841,115 B2
(45) Date of Patent: Dec. 12, 2017

(54) THERMOSTAT VALVE FOR A COMBUSTION ENGINE

(71) Applicant: ILLINOIS TOOL WORKS INC., Glenview, IL (US)

(72) Inventors: Rainer Gramss, Buchholz (DE); Torsten Hauk, Neustadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 7 days.

(21) Appl. No.: 14/910,321

(22) PCT Filed: Jul. 1, 2014

(86) PCT No.: PCT/US2014/045064
§ 371 (c)(1),
(2) Date: Feb. 5, 2016

(87) PCT Pub. No.: WO2015/034576
PCT Pub. Date: Mar. 12, 2015

(65) Prior Publication Data
US 2016/0178081 A1 Jun. 23, 2016

(30) Foreign Application Priority Data
Sep. 3, 2013 (DE) .......................... 10 2013 109 587

(51) Int. Cl.
*F16K 31/02* (2006.01)
*F16K 31/04* (2006.01)
(Continued)

(52) U.S. Cl.
CPC .............. *F16K 31/025* (2013.01); *F01P 7/14* (2013.01); *F16K 11/078* (2013.01); *F16K 11/08* (2013.01);
(Continued)

(58) Field of Classification Search
None
See application file for complete search history.

(56) References Cited

U.S. PATENT DOCUMENTS 3,421,388 A * 1/1969 Carr ................... F16K 31/04
74/625
4,019,586 A * 4/1977 Hauser ................ F16D 11/10
192/48.91
(Continued)

FOREIGN PATENT DOCUMENTS

CN 1239179 12/1999
CN 102954259 3/2013
(Continued)

OTHER PUBLICATIONS

PCT, International Search Report and Written Opinion of the International Searching Authority, International Application No. PCT/US2014/045064; dated Sep. 26, 2014, 2 pages.

*Primary Examiner* — Mark A Manley
(74) *Attorney, Agent, or Firm* — Thompson Hine LLP

(57) ABSTRACT

A thermostat valve includes a housing with several cooling fluid connections, at least two hollow valve elements mounted rotatably next to one another in the housing on a common rotational shaft, each having at least one opening selectively couplable to one or more of the cooling fluid connections by way of rotation of the valve elements, and a rotational drive for a first of the valve elements can be driven rotationally in the housing, a second of the valve elements can be selectively coupled to or decoupled from the first valve element, the second valve element driven rotationally, when it is coupled to the first valve element, and a coupling element mounted axially movably on the rotational shaft, and a coupling drive by way of which the coupling element (Continued)

Figure 1:
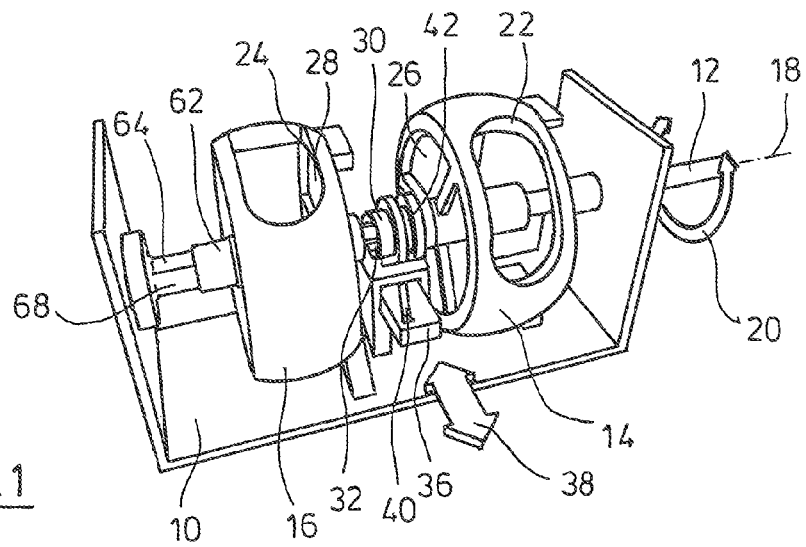

can be moved axially on the rotational shaft between a coupling position and a decoupling position.

20 Claims, 5 Drawing Sheets

(51) Int. Cl.
*F16K 11/078* (2006.01)
*F01P 7/14* (2006.01)
*F16K 11/08* (2006.01)
*F16K 11/16* (2006.01)
*F16D 11/00* (2006.01)

(52) U.S. Cl.
CPC ............ *F16K 11/165* (2013.01); *F16K 31/04* (2013.01); *F01P 2007/146* (2013.01); *F16D 11/00* (2013.01)

(56) References Cited

U.S. PATENT DOCUMENTS

| | | | | |
|---|---|---|---|---|
| 5,979,373 A | * | 11/1999 | Sano | ........................ F01P 7/167 123/41.08 |
| 2013/0048084 A1 | | 2/2013 | Bartnick | |

FOREIGN PATENT DOCUMENTS

| | | | |
|---|---|---|---|
| DE | 10 2006 050826 | | 5/2008 |
| DE | 10 2008 030772 | | 11/2009 |
| DE | 10 2009004157 | | 4/2010 |
| GB | 2283061 | * | 4/1995 |
| WO | WO 2008/049624 | | 5/2008 |

* cited by examiner

THERMOSTAT VALVE FOR A COMBUSTION ENGINE

The invention relates to a thermostat valve for a combustion engine, comprising a housing with several cooling fluid connections, and comprising at least two hollow valve elements which are mounted rotatably such that they are arranged next to one another in the housing on a common rotational shaft, the valve elements having in each case at least one opening which is formed in the region of their shell surface, it being possible for the openings to be connected selectively to one or more of the cooling fluid connections of the housing by way of rotation of the valve elements, and rotational drive means being provided, by way of which a first of the at least two valve elements can be driven rotationally in the housing.

Nowadays, a multiplicity of different coolant circuits are set depending on operational stipulations in order to control and regulate the cooling fluid systems in combustion engines of automobiles. For example, thermostat valves which are driven by electric motor are used which are capable of controlling one or more cooling fluid paths. As valve elements, said thermostat valves use, for example, rotatable cylindrical or spherical segment-shaped hollow rolls, what are known as rotary slides. In order for it to be possible if required to actuate one or more additional cooling fluid circuits, a plurality of rotary slides of this type are coupled to one another, for example, in such a way that they lie on a common rotational axis. If, for example, a cooling fluid circuit is to be operated with or without cabin heating of an automobile, operation without the additional cooling fluid circuit can be controlled, for example, upon rotation in one direction and control of the additional cooling fluid circuits can take place upon rotation in the other direction. To this end, a suitable slotted control guide can be provided between the valve elements.

It is disadvantageous, however, that in each case only less than half of the rotational range of the rotary slides can be utilized to control the two cooling fluid circuits. Depending on the required switching states of the thermostat valve, this leads to undesirably great diameters of the rotary slides.

Proceeding from the described prior art, the invention is based on the object of providing a thermostat valve of the type mentioned at the outset, which permits a multiplicity of switching positions with a small amount of installation space and in a structurally simple way.

The invention achieves the object by way of the subject matter of claim 1. Advantageous refinements are found in the dependent claims, the description and the figures.

For a thermostat valve of the type mentioned at the outset, the invention achieves the object by virtue of the fact that a second of the at least two valve elements can be selectively coupled to the first valve element or decoupled from the first valve element, the second valve element likewise being driven rotationally, in the state in which it is coupled to the first valve element, by way of rotation of the first valve element, that a coupling element which is mounted axially movably on the rotational shaft is provided, and that coupling drive means are provided, by way of which the coupling element can be moved axially on the rotational shaft between a coupling position and a decoupling position, the coupling element producing a rotationally fixed coupling in the coupling position between the first valve element which is driven by the rotational drive means and the second valve element, and releasing said rotationally fixed coupling in the decoupling position.

The thermostat valve is provided for use in a combustion engine of an automobile. To this extent, the invention also relates to a combustion engine of an automobile having a thermostat valve according to the invention. The valve elements which are provided according to the invention form what are known as rotary slides. They can be of hollow-cylindrical or hollow-spherical configuration, for example. The valve elements can correspondingly have a spherical or spherical segment-shaped or cylindrical or cylindrical segment-shaped shell surface. In each case one or more openings which are delimited, in particular, by the shell surfaces are formed in the shell surfaces in a manner which is known per se. The openings can selectively release or close different cooling fluid connections of the housing and, as a result, connect them to one another or disconnect them from one another. The valve elements of the thermostat valve according to the invention are arranged next to one another. In particular, the valve elements can therefore switch cooling fluid connections of the housing in a targeted manner which lie next to one another along the rotational axis of the valve elements, that is to say connect them to one another or disconnect them from one another. In a manner which is known per se, the cooling fluid connections of the housing form passages to various cooling fluid lines of a cooling fluid system of the combustion engine. For example, the valve element which is not self-driven can release or close a cooling fluid circuit which is to be controlled additionally if required.

According to the invention, at least two valve elements are provided, it being possible for the valve elements to selectively be coupled to one another or decoupled from one another. One of the valve elements is driven rotationally and also rotates the second valve element in the coupled state, which second valve element is, in particular, not self-driven. In the coupled state, the valve elements are connected, in particular, fixedly to one another so as to rotate together, with the result that they are rotated together in both rotational directions. A synchronous movement of the coupled valve elements therefore then takes place. In the non-coupled state, in contrast, the first valve element can be rotated independently of the second valve element, that is to say without rotation of the second valve element.

In order to couple or decouple the valve elements, a coupling element which is mounted axially movably on the rotational shaft is provided according to the invention. Coupling drive means move the coupling element on the rotational shaft in the axial direction between a coupling position and a decoupling position. In the coupling position, a rotationally fixed connection is produced between the first valve element which is driven by the rotational drive means and the passive second valve element. Said connection is released in the decoupling position. As has been explained, the first valve element is rotated upon rotation of the rotational shaft. In particular, said first valve element can be connected fixedly to the rotational shaft so as to rotate with it. However, it is also possible that, for example, the coupling element is connected fixedly to the rotational shaft so as to rotate with it and the first valve element is likewise rotated by way of rotation of the rotational shaft via a rotationally fixed connection to the coupling element. In this case, the first valve element does not itself have to be connected fixedly to the rotational shaft so as to rotate with it. It goes without saying that it is also possible that both the coupling element and the first valve element are connected fixedly to the rotational shaft so as to rotate with it. In contrast, the second valve element is mounted rotatably on the rotational shaft, with the result that it can selectively be rotated with the first valve element in the coupled state or can remain in a fixed rotational position despite rotation of the rotational shaft in the decoupled state.

As a result of the selective coupling and decoupling of the valve elements which is realized via the coupling drive means and the coupling element, in each case practically the entire rotational range of the valve elements is available for the coupled and for the decoupled rotational movement of the valve elements. A considerably larger number of different switching states can therefore be realized with the thermostat valve with a small amount of installation space in comparison with the prior art.

In a manner which is known per se, the first valve element and the second valve element can have axial openings which communicate with one another on their mutually facing sides. Via said axial openings, cooling fluid can flow between cooling fluid connections which are connected by way of the two valve elements.

It goes without saying that more than two valve elements can also be provided. The further valve elements can be self-driven or not. In the latter case, they can likewise be driven by way of the drive means of another valve element, for example of the first valve element.

According to one refinement, the coupling element can engage in a form-fit manner into the first valve element in the coupling position as well as in the decoupling position. The coupling element is then therefore rotated permanently together with the first valve element. According to a further refinement, the coupling element can engage in a form-fit manner into the second valve element in the coupling position. It is also possible here that the coupling element can engage in a form-fit manner into the second valve element in a plurality of rotational positions of the first valve element. It can be provided, furthermore, that the coupling element is a coupling bushing which is mounted on the rotational shaft such that it can be displaced axially between the first and second valve element, a coupling section being formed on the side of said coupling bushing which faces the second valve element, which coupling section engages in a form-fit manner into a corresponding coupling section of the second valve element in the coupling position.

The coupling sections can have, for example, in each case one toothing system which comes into engagement with one another. In the case of a plurality of possible rotational positions for the form-fit connection, the coupling sections can have, for example, a rotationally symmetrical toothing system which can come into engagement with one another in a plurality of, for example four, possible rotational positions. Even more switching states can be realized by way of a coupling of this type in different relative rotational positions of the valve elements with respect to one another. The coupling bushing can be, for example, of hollow-cylindrical configuration.

According to a further refinement, it can be provided that the coupling drive means have a coupling drive and a cam element with a control cam, which cam element can be moved perpendicularly with respect to the rotational axis of the rotational shaft by way of the coupling drive, that the coupling bushing has a guide groove which runs in the circumferential direction over its outer surface, and that a control pin is provided which is guided movably in the axial direction of the rotational shaft in an elongated hole of the housing and is guided with its one end in the guide groove and with its other end is guided in the control cam in such a way that, in the case of a movement of the cam element which takes place transversely with respect to the rotational axis of the rotational shaft, the control pin is moved in the axial direction of the rotational shaft and in the process likewise moves the coupling bushing in the axial direction of the rotational shaft.

The cam element is moved by way of the coupling drive perpendicularly with respect to the longitudinal axis of the rotational shaft. A control cam which runs, for example, at an angle of less than 45° with respect to the movement direction of the cam element is formed in the surface of the cam element. Said control cam can be formed, for example, by way of a groove. A control pin runs with its one end in the control cam. With its other end, the control pin runs in a guide groove which runs around over the circumference of the coupling bushing in an annular and concentric manner with respect to the rotational axis of the coupling bushing, in particular in a circularly annular manner. The coupling bushing can therefore be rotated with the rotational shaft while the control pin runs around in the guide groove which is circularly annular, for example. If, in the case of a movement of the cam element, the control pin is guided by the control cam in the elongated hole of the housing in the axial direction of the rotational shaft, it drives the coupling bushing in the axial direction on account of being guided in the guide groove of said coupling bushing. The movement of the cam element which takes place perpendicularly with respect to the rotational axis of the rotational shaft is thus converted into a translatory movement of the coupling bushing in the axial direction of the rotational shaft.

According to a further refinement, it can be provided that the coupling drive means comprise a coupling drive and an engagement lever which can be pivoted by way of the coupling drive about a pivoting axis which runs perpendicularly with respect to the rotational axis of the rotational shaft, which engagement lever interacts with the coupling bushing in such a way that, in the case of pivoting of the engagement lever, the coupling bushing is displaced axially on the rotational shaft. It can be provided, furthermore, that the engagement lever has at least one engagement projection which is guided in a guide groove which runs in the circumferential direction over the outer surface of the coupling bushing, or that the coupling bushing has a guide collar which runs in the circumferential direction over the outer surface of the coupling bushing and is guided in at least one guiding reception which is formed on the engagement lever. Once again, the guide groove or the guide collar runs concentrically with respect to the rotational axis of the coupling bushing in an annular manner, in particular in a circularly annular manner, around the circumference of the coupling bushing. The engagement lever can have, for example, a claw-shaped engagement section with, for example, two engagement projections which lie opposite one another and engage into the guide groove. A pivoting movement of the engagement lever about the pivoting axis which runs perpendicularly with respect to the rotational axis of the rotational shaft then moves the coupling bushing in the axial direction on the rotational shaft. A pivotable engagement lever of this type has the advantage that tilting cannot occur during operation. The embodiment with an engagement lever is therefore distinguished by particular robustness.

According to a further refinement, blocking means can be provided which, after a decoupling of the second valve element from the first valve element, hold the second valve element in its rotational position which was present during decoupling. Blocking means of this type are important, in order that the second valve element has the correct rotational position for renewed coupling to the first valve element. This applies, in particular, if a form-fit connection to the first valve element is to be produced via the coupling element, which form-fit connection can be realized only in defined rotational positions.

With regard to this, it can be provided, furthermore, that the blocking means comprise a blocking element which is mounted in an axially displaceable and rotationally fixed manner on the side which faces away from the first valve element between the second valve element and a housing section and is prestressed by a spring means in the direction of the second valve element into a blocking position, which blocking element engages in a form-fit manner into the second valve element in the blocking position and thus prevents a rotation of the second valve element, and which blocking element can be pressed counter to the prestress of the spring means into a release position, in which the form-fit connection with the second valve element is released, with the result that the second valve element can be rotated. The blocking element can be, for example, a bushing which is arranged fixedly on the rotational shaft so as to rotate with it, but also in an axially displaceable manner. A helical spring which is, for example, cylindrical and prestresses the blocking element in the direction of the second valve element into the blocking position is arranged between the blocking element and the housing wall. In the blocking position, a form-fit connection of the blocking element to the second valve element takes place, with the result that said second valve element is likewise blocked against rotation. It is once again possible that the form-fit connection is possible in a plurality of rotational positions of the second valve element.

At its end which faces away from the first valve element, the coupling bushing can have an extension which is, for example, hollow-cylindrical and surrounds the rotational shaft in a bushing-like manner, on which extension the second valve element is mounted rotatably, and which extension, in the coupling position of the coupling bushing, presses the blocking element counter to the prestress of the spring means into the release position. The extension is arranged on the rotational shaft, with the result that the second valve element rotates on the extension. The extension presses the blocking element into the release position when the coupling bushing is moved into its coupling position. In the decoupling position, the extension is withdrawn again, with the result that the blocking element is pressed into the blocking position again by way of the spring means.

Furthermore, stops can be provided on the housing, which stops interact with corresponding stops on the first and second valve element and thus define end positions of the rotational movement of the first and second valve element. Stops of this type can be important for what is known as on-board diagnosis (OBD). For this purpose, end positions of the first and second valve element can be moved to in a targeted manner and can be sampled for the OBD.

The rotational drive means and the coupling drive means can be, in particular, drive means which can be actuated separately. The coupling and decoupling is therefore completely independent of a rotational movement of the valve elements. As rotary drive, the rotational drive means can comprise, for example, an electric motor drive or a vacuum drive. As coupling drive, the coupling drive means can likewise comprise, for example, a vacuum drive or an electromagnetic drive or an electric motor drive. A suitable control and regulating device can be provided for controlling the thermostat valve, as is known per se.

Figure 2:
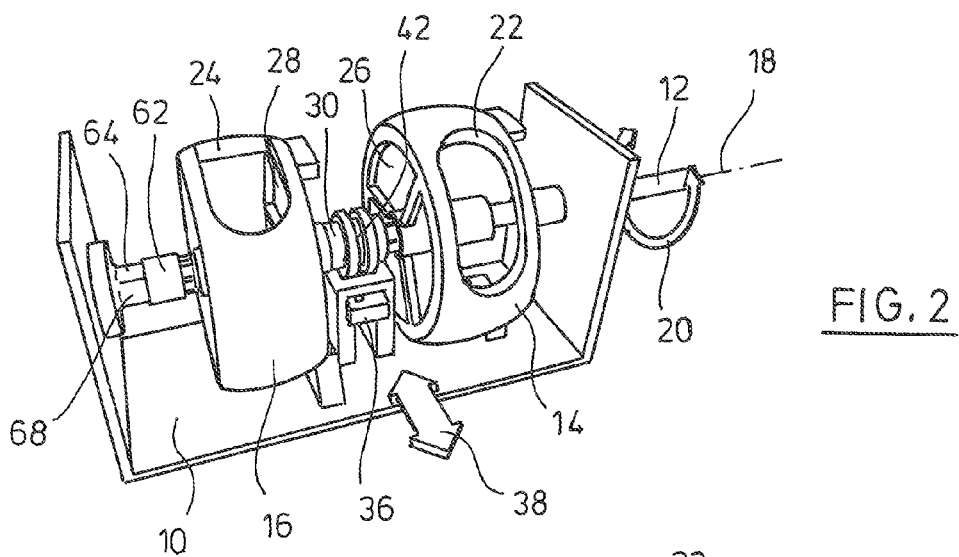
Figure 3:
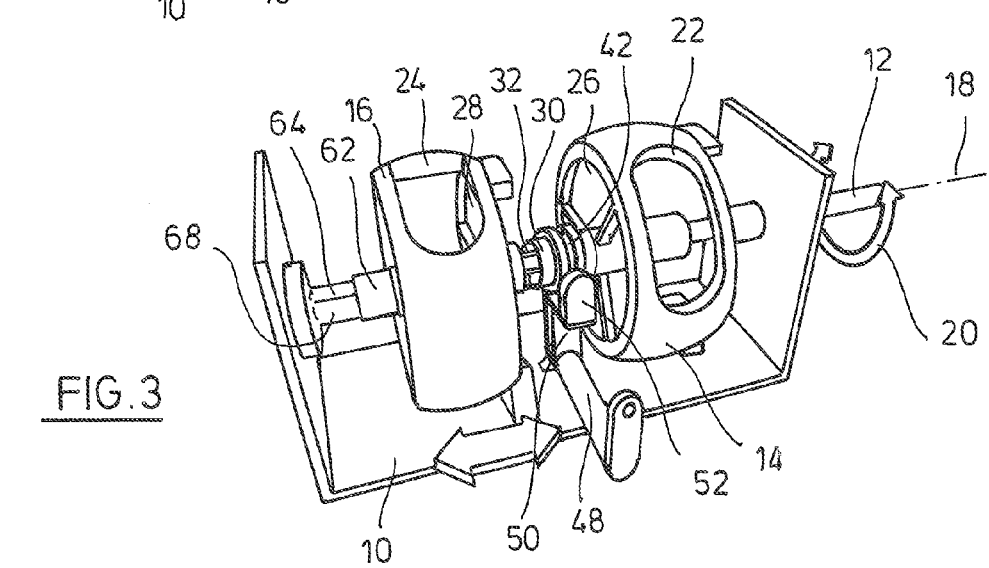
Figure 4:
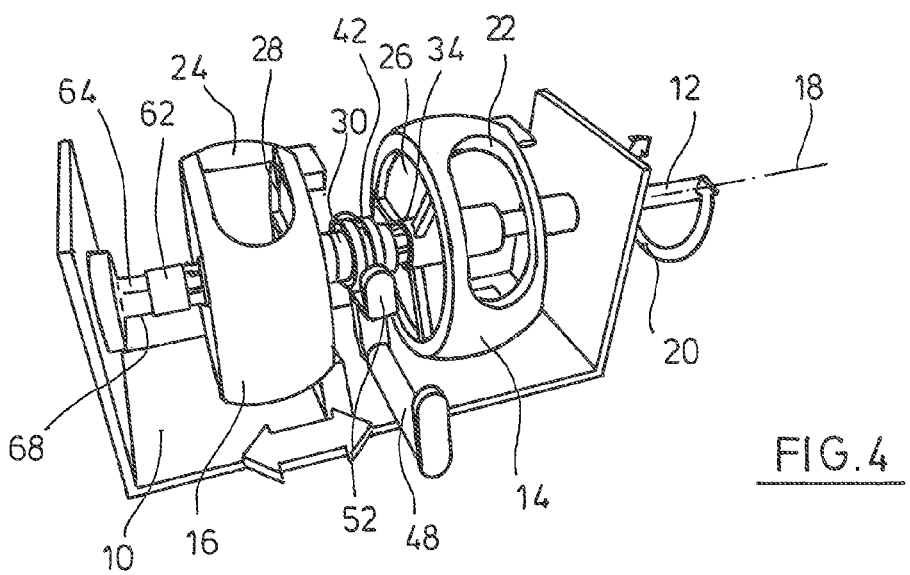
Figure 5:
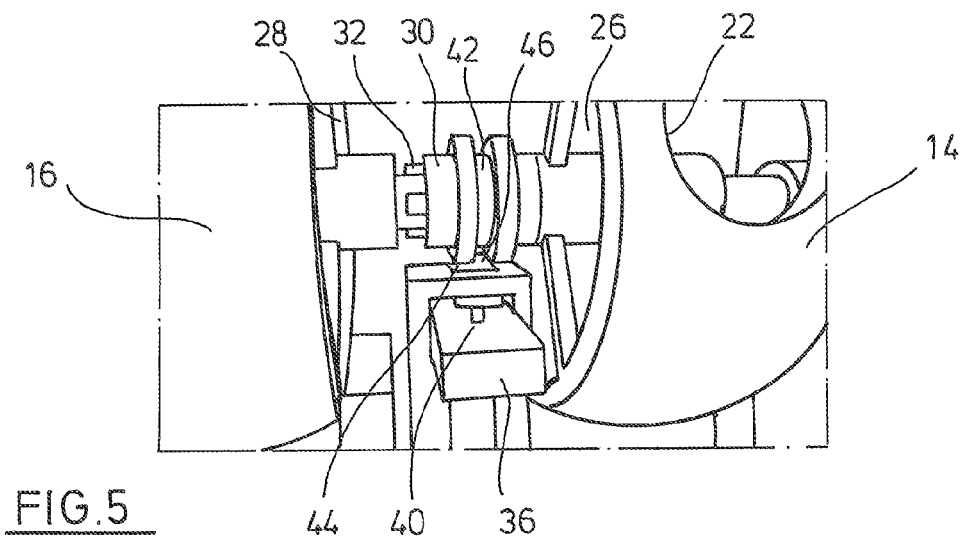
Figure 6:
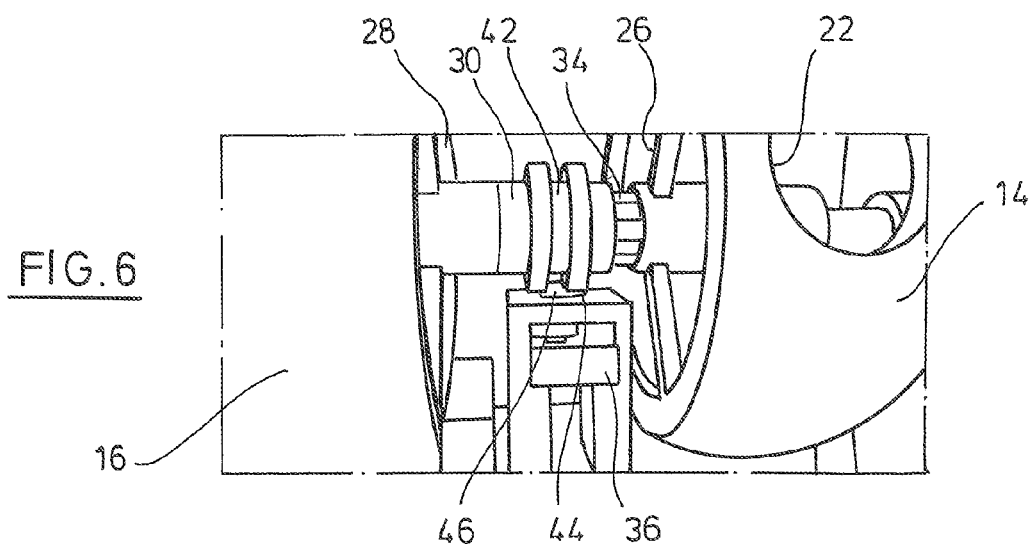
Figure 7:
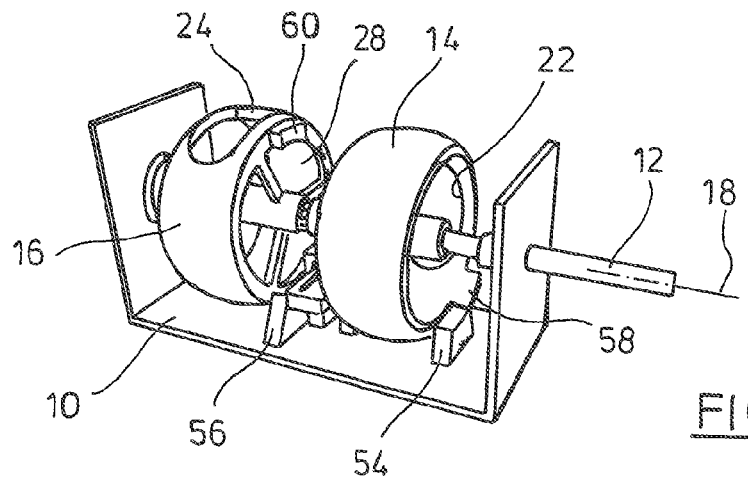
Figure 8:
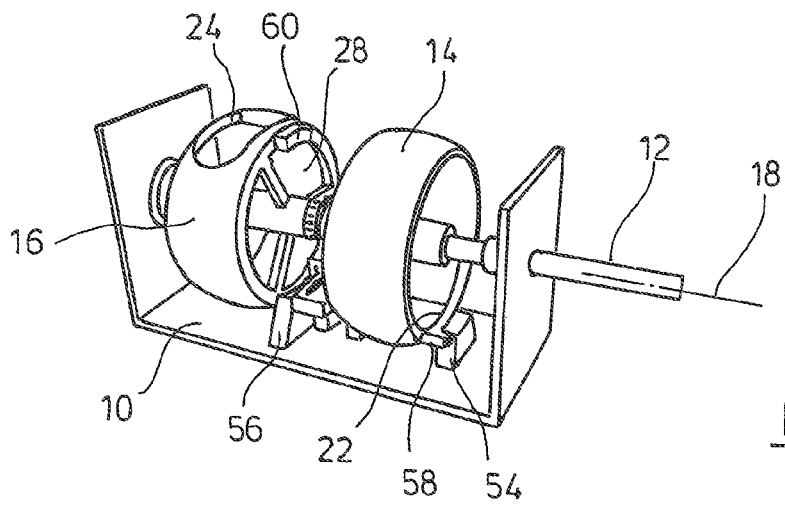
Figure 9:
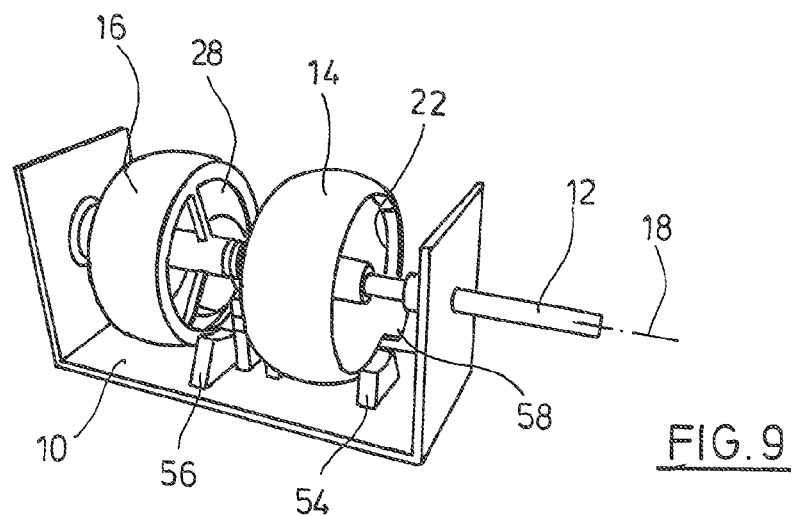
Figure 10:
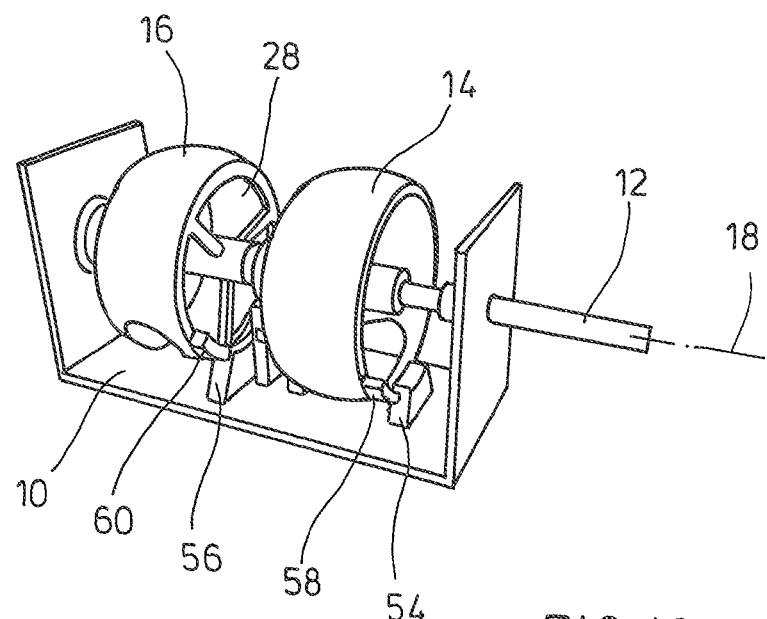
Figure 11:
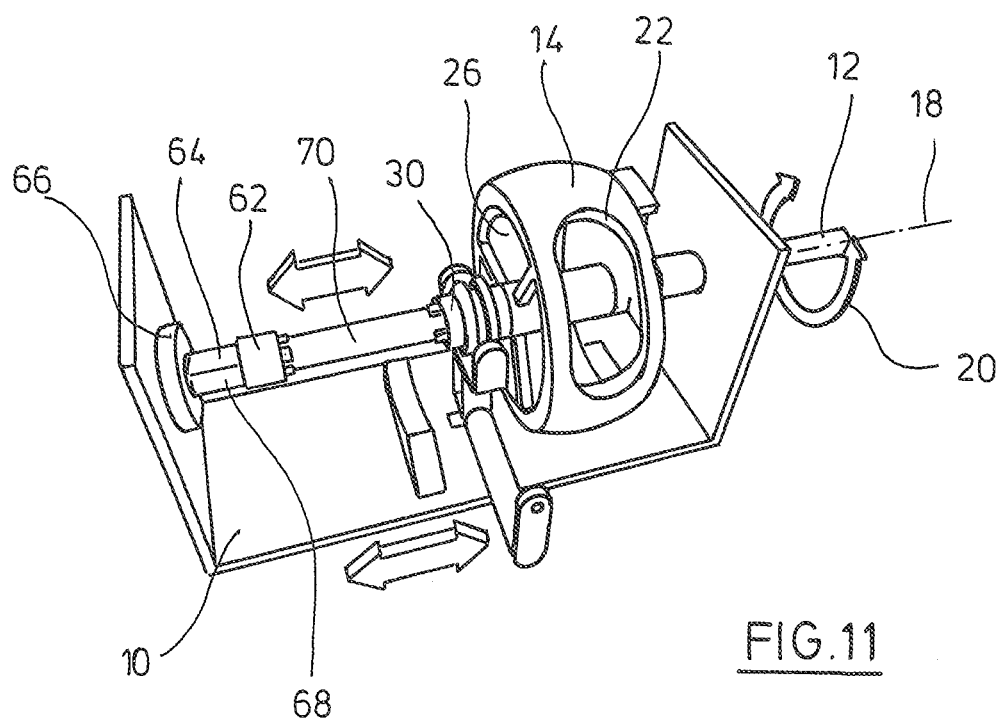
Figure 12:
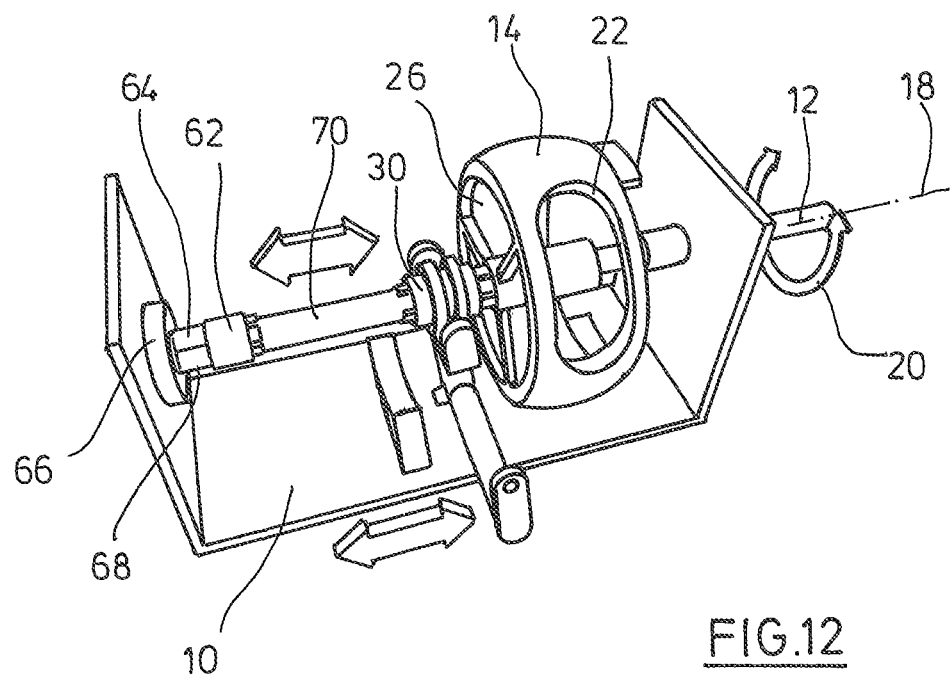
Figure 13:
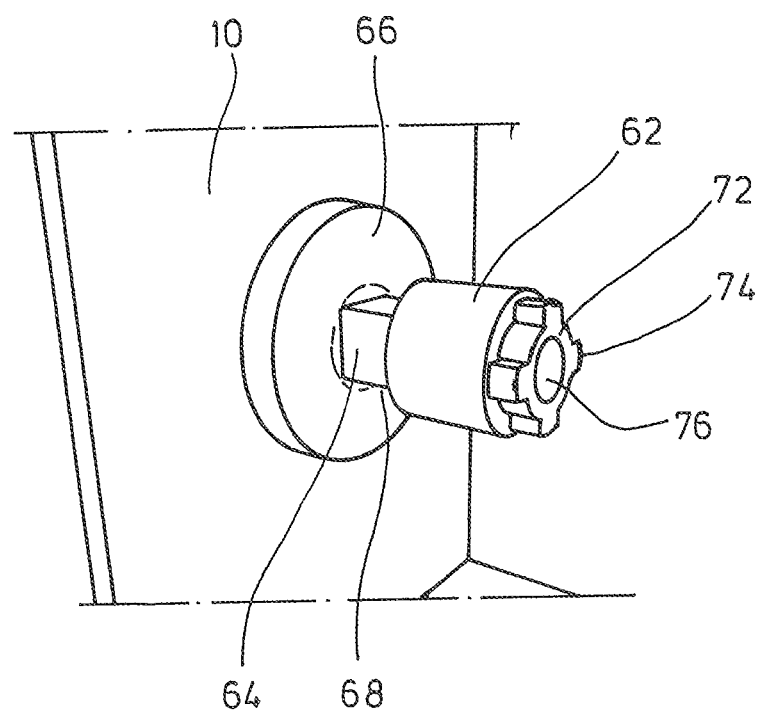

In the following text, exemplary embodiments of the invention will be explained in greater detail using figures, in which, diagrammatically:

FIG. 1 shows part of a thermostat valve according to the invention in accordance with a first exemplary embodiment in a first operating state, in a perspective view, FIG. 2 shows the illustration from FIG. 1 in a second operating state, FIG. 3 shows part of a thermostat valve according to the invention in accordance with a second exemplary embodiment in a first operating state, in a perspective view, FIG. 4 shows the illustration from FIG. 3 in a second operating state, FIG. 5 shows an enlarged detail of the illustration from FIG. 1, FIG. 6 shows an enlarged detail of the illustration from FIG. 2, FIG. 7 shows the exemplary embodiment of FIGS. 1 and 2 in a further perspective view in a further operating state, FIG. 8 shows the exemplary embodiment of FIGS. 1 and 2 in a further perspective view in a further operating state, FIG. 9 shows the exemplary embodiment of FIGS. 1 and 2 in a further perspective view in a further operating state, FIG. 10 shows the exemplary embodiment of FIGS. 1 and 2 in a further perspective view in a further operating state, FIG. 11 shows a further view of the illustration from FIG. 3, the second valve element not being shown for reasons of visualization, FIG. 12 shows a further view of the illustration from FIG. 4, the second valve element not being shown for reasons of visualization, and FIG. 13 shows an enlarged detail of the thermostat valve according to the invention.

If nothing else is indicated, identical designations denote identical objects in the figures. The thermostat valve according to the invention (shown in the figures) for a combustion engine of an automobile comprises a housing with a plurality of cooling fluid connections to cooling fluid lines of a cooling fluid system of the combustion engine. The cooling fluid system can have a control and regulating device which is known per se for controlling and regulating the thermostat valve. The control and regulating device then receives measured values of at least one sensor, which measured values form the basis for the control and regulation. For example, one or more temperature sensors can be provided which measure the cooling fluid temperature.

For reasons of visualization, in each case only a section 10 of the housing of the thermostat valve is shown in the figures. A first valve element 14 and a second valve element 16 are arranged on a common rotational shaft 12. The first valve element 14 is connected fixedly to the rotational shaft 12 so as to rotate with it. By means of drive means which are not shown in greater detail, for example electric motor drive means, the rotational shaft 12 and, with it, the first valve element 14 can be rotated about a rotational axis 18, as illustrated, in particular, in FIGS. 1 to 4 by way of the double arrow 20. The second valve element 16 is likewise mounted on the rotational shaft 12 such that it can be rotated about the rotational axis 18. The first and second valve element 14, 16 in each case have a spherical segment-shaped shell surface and are of hollow configuration. The valve elements 14, 16 in each case have at least one opening 22, 24 which is delimited by the shell surface. The openings 22, 24 can be brought selectively into congruence with the cooling fluid connections of the housing, in order to connect the respective cooling fluid lines to one another or to disconnect them from one another. For this purpose, the first and second valve element 14, 16 have, furthermore, axial openings 26, 28 at least on their end faces which face one another, via which openings 26, 28 cooling fluid can flow between the valve elements 14, 16.

The valve elements 14, 16 can be selectively coupled to one another or decoupled from one another in a manner which is still to be explained in the following text. In the coupled state, the valve elements 14, 16 can be rotated synchronously in both rotational directions about the rotational axis 18, the first valve element 14 which is driven by way of the rotational drive means also rotating the second valve element 16 which is not driven itself, on account of the coupling. In a decoupled state of the valve elements 14, 16, in contrast, the first valve element 14 can be driven on its own rotationally about the rotational axis 18 by way of the rotational drive means, while the second valve element 16 is not also rotated.

In the first exemplary embodiment which is shown in FIGS. 1 and 2 and the enlarged illustrations of FIGS. 5 and 6, a coupling bushing 30 which is mounted on the rotational shaft 12 such that it can be displaced axially between the first and the second valve element 14, 16 is provided as coupling element. The coupling bushing 30 has a hollow-cylindrical basic shape. On its side which faces the second valve element 16, a coupling section is formed on the coupling bushing 30 with a rotationally symmetrical toothing system 32 which can be seen, for example, in FIG. 5. A toothing system of this type is also formed on that side of the coupling element 30 which faces the first valve element 14, as can be seen at the designation 34 in FIG. 6. Said toothing system 34 is permanently in form-fit engagement with the first valve element 14, with the result that the coupling bushing 30 and the first valve element 14 are rotated together at all times. However, the toothing system 32 which is formed on the opposite side of the coupling bushing 30 is in form-fit engagement with the second valve element 16 only in the coupling position of the coupling bushing 30 (shown in FIGS. 2 and 6). In the decoupling position of the coupling bushing 30 (shown in FIGS. 1 and 5), this form-fit engagement of the toothing system 32 is canceled. It goes without saying that toothing systems which correspond to the toothing systems 32, 34 are formed on the first and second valve element 14, 16. In the example which is shown, the toothing system 32 has four teeth which are formed at an identical rotary angle spacing, with the result that coupling of the first and second valve element 14, 16 to one another is possible in four different rotational positions. It goes without saying that a toothing system with more or fewer than four teeth is also possible.

For a change between the coupling position and the decoupling position, the coupling bushing 30 is moved in the axial direction on the rotational shaft 12. In the exemplary embodiment according to FIGS. 1 and 2 and 5 and 6, a cam element 36 is provided for this purpose which can be displaced in a direction perpendicularly with respect to the rotational axis 18 of the rotational shaft 12 by way of a coupling drive (not shown), for example an electromagnetic coupling drive. The movement of the cam element 36 is illustrated by way of the double arrow 38 in FIGS. 1 and 2. A control cam 40 which is formed by way of a groove 40 is formed on the upper side of the cam element 36. As can be seen, in particular, in FIGS. 1 and 5, the control cam 40 has a cam section which runs at an angle of less than 45° with respect to that rotational movement of the cam element 36 which is defined by way of the double arrow 38. Moreover, it can be seen in the figures that the coupling bushing 30 has a guide groove 42 which runs in a circularly annular manner over its circumference. Moreover, it can be seen, in particular, in FIGS. 5 and 6 that a control pin 46 is guided movably in the axial direction of the rotational shaft 12 in an elongated hole 44 of the housing. The control pin 46 is guided with its one end (its upper end in FIGS. 5 and 6) in the guide groove 42 of the coupling bushing 30 and is guided with its other end (its lower end in FIGS. 5 and 6) in the control cam 40 of the cam element 36. As can be seen in FIGS. 1 and 2 and 5 and 6, a movement of the cam element 36 in the direction of the double arrow 38 on account of the control cam 40 leads to an axial movement of the control pin 46 in the elongated hole 44, the control pin 46 driving the coupling bushing 30 in the axial direction of the rotational shaft 12 between the decoupling position which is shown in FIGS. 1 and 5 and the coupling position which is shown in FIGS. 2 and 6.

FIGS. 3 and 4 show a second exemplary embodiment for the coupling of the first and second valve element 14, 16. This exemplary embodiment corresponds largely to the exemplary embodiment which is shown in FIGS. 1 and 2. In contrast to the exemplary embodiment of FIGS. 1 and 2, however, the coupling drive means of FIGS. 3 and 4 comprise an engagement lever 50 which is mounted such that it can be pivoted about the longitudinal axis of a cylindrical section 48 and therefore perpendicularly with respect to the rotational axis 18 of the rotational shaft 12. The engagement lever 50 has a claw-shaped engagement section 52, in each case one engagement projection being provided on the opposite inner sides of the limbs of the claw-shaped engagement section 52. The engagement projections are guided in the guide groove 42 of the coupling bushing 30. If pivoting of the engagement lever 50 takes place about the cylindrical section 48 by means of coupling drive means which are not shown in greater detail, the engagement section 52 drives the coupling bushing 30 by way of its engagement projections, with the result that said coupling bushing 30 is once again moved in the axial direction of the rotational shaft 12 between the decoupling position which is shown in FIG. 3 and the coupling position which is shown in FIG. 4.

Moreover, two stops 54, 56 which are formed on the housing section 10 can be seen, in particular, in FIGS. 7 to 10. Said stops 54, 56 interact with corresponding stops 58, 60 of the first and second valve element 14, 16. In this way, different stop positions of the first and second valve element 14, 16 can be moved to, in order to check the correct function of the valve elements 14, 16 for on-board diagnosis, as shown in FIGS. 7 to 10.

Moreover, blocking means are to be explained using FIGS. 11 to 13, which blocking means hold the second valve element 16, after being decoupled from the first valve element 14, in its rotational position which was present during decoupling. The blocking means are explained in FIGS. 11 to 13 by way of example using the exemplary embodiment which is shown in FIGS. 3 and 4. It goes without saying that the blocking means are used in the same way in the exemplary embodiment which is shown in FIGS. 1 and 2. Moreover, FIGS. 11 and 12 do not show the second valve element 16 for reasons of visualization.

A bushing-shaped blocking element 62 can be seen in FIGS. 11 to 13. It is mounted on a rectangular section 64 which surrounds the rotational shaft 12 in a manner which is axially displaceable but rotationally fixed. A cylindrical helical spring 68 is arranged between the blocking element 62 and a housing section 66, which helical spring 68 prestresses the blocking element 62 into the blocking position which is shown in FIG. 11. In said blocking position, the blocking element 62 engages in a form-fit manner into the second valve element 16, as can also be seen in FIGS. 1 and 3. In said blocking position, the blocking element 62 prevents a rotation of the second valve element 16.

Moreover, a hollow-cylindrical extension 70 of the coupling bushing 30, which extension 70 is arranged on the rotational shaft 12, can be seen in FIGS. 11 and 12. In the coupling position of the coupling bushing 30 which is shown in FIG. 12, the extension 70 presses the blocking element 62 counter to the spring prestress of the helical spring 68 in the direction of the housing section 66. In this state, the blocking element 62 is out of engagement with the second valve element 16, as can also be seen in FIGS. 2 and 4, with the result that the second valve element 16 can be rotated together with the first valve element 14. If the coupling bushing 30 is moved back into the decoupling position, the extension 70 which is configured in one piece with the coupling bushing 30 also moves back, with the result that the blocking element 62 is moved into its blocking position which is shown in FIG. 11 again by way of the spring prestress of the helical spring 68.

A blocking section 72 which brings about the form-fit connection of the blocking element 62 to the second valve element 16 can be seen in FIG. 13. As can be seen, the blocking section 72 has four teeth 74 which are formed at an identical rotary angle spacing and can come into form-fit engagement with a corresponding toothing system in the second valve element 16, to be precise in four different rotational positions. It goes without saying that a toothing system with more or fewer than four teeth is also possible. Moreover, a central hole 76 can be seen, in which the rotational shaft 12 is mounted rotationally.

The invention claimed is:

1. Thermostat valve for a combustion engine, comprising a housing with several cooling fluid connections, and comprising at least two hollow valve elements, which are arranged in the housing adjacent to one another and rotatable on a common rotational shaft that extends through the housing and the valve elements, wherein the valve elements each comprise at least one opening formed in the area of their shell surface, wherein the openings can be selectively connected with one or several of the cooling fluid connections of the housing through rotation of the valve elements, wherein a first of the at least two valve elements is fixed for rotation with the rotational shaft and a second of the at least two valve elements is not fixed for rotation with the rotational shaft, and wherein rotational drive means are provided with which to rotate the rotational shaft and the first valve element in the housing, characterized in
that the second valve element can be selectively coupled with the first valve element or decoupled from the first valve element, wherein the second valve element, when coupled with the first valve element, is also rotatably driven upon a rotation of the first valve element,
that a coupling element is provided axially moveable on a portion of the rotational shaft between the first valve element and the second valve element, and that coupling drive means are provided with which the coupling element is axially moveable on the rotational shaft between a coupling position and a decoupling position, wherein the coupling element provides a torque-proof coupling between the first valve element driven by the rotational drive means and the second valve element in the coupling position and releases this torque-proof coupling in the decoupling position.

2. Thermostat valve according to claim 1, characterized in that the coupling element engages in a form-fit manner into the first valve element in the coupling position as well as in the decoupling position.

3. Thermostat valve according to claim 2, characterized in that the coupling element engages in a form-fit manner in the second valve element in the coupling position.

4. Thermostat valve according to claim 3, characterized in that the coupling element can engage in a form-fit manner into the second valve element in several rotational positions of the first valve element.

5. Thermostat valve according to claim 3, characterized in that the coupling element is a coupling bushing provided axially moveable on the rotational shaft between the first and second valve element, wherein a coupling section is provided on the side of the coupling bushing facing towards the second valve element, which engages in a form-fit manner in a corresponding coupling section of the second valve element in the coupling position.

6. Thermostat valve according to claim 5, characterized in that the coupling drive means comprises a coupling drive and a cam element with a control cam and moveable through the coupling drive perpendicular to the rotational axis of the rotational shaft, that the coupling bushing comprises a guide groove extending in circumferential direction over its outer surface, and that a control pin is provided which is guided moveably in an elongated hole of the housing in axial direction of the rotational shaft, which control pin is guided with its one end in the guiding groove and with its other end in the control cam such that the control pin, upon a movement of the cam element transverse to the rotational axis of the rotational shaft is moved in axial direction of the rotational shaft and thereby also moves the coupling bushing in axial direction of the rotational shaft.

7. Thermostat valve according to claim 5, characterized in that the coupling drive means comprises a coupling drive and an engagement lever pivotable through the coupling drive about a pivoting axis extending perpendicular to the rotational axis of the rotational shaft, which engagement lever engages with the coupling bushing such that the coupling bushing is axially moved on the rotational shaft upon a pivoting of the engagement lever.

8. Thermostat valve according to claim 7, characterized in that the engagement lever comprises at least one engagement projection which is guided in a guiding groove extending in circumferential direction over the outer surface of the coupling bushing, or that the coupling bushing comprises a guiding collar extending in circumferential direction over the outer surface of the coupling bushing, which guiding collar is guided in at least one guiding reception provided on the engagement lever.

9. Thermostat valve according to claim 8, characterized in that blocking means are provided which, after a decoupling of the second valve element from the first valve element, hold the second valve element in its rotational position present upon the decoupling.

10. Thermostat valve according to claim 9, characterized in that the blocking means comprise a blocking element provided axially moveable and rotationally fixed on the side facing away from the first valve element between the second valve element and a housing section, and being biased by spring means in the direction of the second valve element into a blocking position, which blocking element in the blocking position engages in a form-fit manner into the second valve element and thus inhibits a rotation of the second valve element, and which blocking element can be pushed against the bias of the spring means into a release position in which the form fit with the second valve element is released such that the second valve element is rotatable.

11. Thermostat valve according to claim 10, characterized in that the coupling bushing on its end facing away from the first valve element comprises an extension surrounding the rotational shaft in a bushing manner, on which extension the second valve element is rotatably provided and which extension, in the coupling position of the coupling bushing, pushes the blocking element against the bias of the spring means into the release position.

12. Thermostat valve according to claim 1, characterized in that stops are provided on the housing which engage with corresponding stops on the first and second valve element and thus define end positions of the rotational movement of the first and second valve element.

13. Thermostat valve according to claim 1, characterized in that the rotational drive means and the coupling drive means are separately engagable drive means.

14. A thermostat valve for a combustion engine, comprising a housing with multiple cooling fluid connections, and comprising at least a first valve element that is hollow and a second valve element that is hollow, which are arranged in the housing adjacent to one another and rotatable on a common rotational shaft extending through both the first valve element and the second valve element, wherein each of the first valve element and the second valve element comprises at least one opening formed in a shell surface of the respective valve element, wherein each opening can be selectively connected with one or more of the cooling fluid connections of the housing through rotation of the respective valve element, and wherein the first valve element is fixed for rotation with the rotational shaft and the second valve element is not fixed for rotation with the rotational shaft, wherein:

the second valve element can be selectively coupled with the first valve element or decoupled from the first valve element via movement of a coupling element located on the rotational shaft between the first valve element and the second valve element and axially moveable along the rotational shaft between a coupling position and a decoupling position, wherein the second valve element, when coupled with the first valve element, is also rotatably driven upon a rotation of the first valve element, the coupling element provides a torque-proof coupling between the first valve element and the second valve element in the coupling position and releases this torque-proof coupling in the decoupling position.

15. The thermostat valve according to claim 14, wherein the coupling element engages in a form-fit manner into the first valve element in the coupling position as well as in the decoupling position.

16. The thermostat valve according to claim 15, wherein the coupling element engages in a form-fit manner in the second valve element in the coupling position.

17. The thermostat valve according to claim 14, wherein a blocking element is provided axially moveable and fixed against rotation at a side of the first valve element that is opposite the second valve element, the blocking element axially movable from a blocking position to a release position, in the blocking position the blocking element inhibits rotation of the second valve element, in the release position the blocking element does not inhibit rotation of the second valve element, wherein an axial movement of the coupling element from the decoupling position to the coupling position causes an axial movement of the blocking element from the blocking position to the release position.

18. The thermostat valve of claim 17 wherein the blocking element is biased by a spring into the blocking position.

19. A thermostat valve for a combustion engine, the valve comprising:

a housing with multiple cooling fluid connections, at least a first valve element that is hollow and a second valve element that is hollow, the first valve element and the second valve element arranged side-by-side in the housing on a common rotational shaft that extends through both the first valve element and the second valve element, wherein each of the first valve element and the second valve element comprises at least one opening formed in a shell surface of the respective valve element, wherein each opening can be selectively connected with one or more of the cooling fluid connections of the housing through rotation of the respective valve element, and wherein the first valve element is fixed for rotation with the rotational shaft and the second valve element is not fixed for rotation with the rotational shaft, wherein a coupling element is located on the rotational shaft between the first valve element and the second valve element and is axially movable along the rotational shaft between a coupling position and a decoupling position, in the coupling position the coupling element is engaged with both the first valve element and the second valve element so that a torque-proof coupling is provided between the first valve element and the second valve element such that rotation of the first valve element causes rotation of the second valve element, in the release position the coupling element is engaged with the first valve element but not the second valve element in order to release the torque-proof coupling so that rotation of the first valve element no longer causes rotation of the second valve element.

20. The thermostat valve according to claim 19, wherein a blocking element is located on a side of the first valve element that is opposite the second valve element, the blocking element is axially movable from a blocking position to a release position, in the blocking position the blocking element inhibits rotation of the second valve element, in the release position the blocking element does not inhibit rotation of the second valve element, wherein an axial movement of the coupling element from the decoupling position to the coupling position causes an axial movement of the blocking element from the blocking position to the release position.

* * * * *